(12) United States Patent
Yagi

(10) Patent No.: US 10,501,005 B2
(45) Date of Patent: Dec. 10, 2019

(54) VEHICLE LIGHTING SYSTEM

(71) Applicant: Koito Manufacturing Co., Ltd., Tokyo (JP)

(72) Inventor: Takayuki Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/017,006

(22) Filed: Jun. 25, 2018

(65) Prior Publication Data

US 2019/0009704 A1 Jan. 10, 2019

(30) Foreign Application Priority Data

Jul. 6, 2017 (JP) .................................. 2017-133055

(51) Int. Cl.

| | |
|---|---|
| *B60Q 1/04* | (2006.01) |
| *B64C 13/18* | (2006.01) |
| *B64C 39/02* | (2006.01) |
| *B60Q 1/00* | (2006.01) |
| *F21S 41/14* | (2018.01) |
| *F21S 41/67* | (2018.01) |
| *G02B 26/10* | (2006.01) |
| *B60Q 1/24* | (2006.01) |
| *F21S 41/125* | (2018.01) |
| *F21S 41/13* | (2018.01) |
| *F21S 41/32* | (2018.01) |
| *F21S 41/675* | (2018.01) |
| *F21S 41/16* | (2018.01) |

(Continued)

(52) U.S. Cl.
CPC ............ *B60Q 1/04* (2013.01); *B60Q 1/0035* (2013.01); *B60Q 1/24* (2013.01); *B64C 13/18* (2013.01); *B64C 39/02* (2013.01); *B64C 39/024* (2013.01); *F21S 41/125* (2018.01); *F21S 41/13* (2018.01); *F21S 41/14* (2018.01); *F21S 41/16* (2018.01); *F21S 41/321* (2018.01); *F21S 41/365* (2018.01); *F21S 41/67* (2018.01); *F21S 41/675* (2018.01); *G02B 26/101* (2013.01); *B60Q 2300/45* (2013.01); *B64C 2201/027* (2013.01); *B64C 2201/12* (2013.01); *F21W 2103/60* (2018.01)

(58) Field of Classification Search
CPC ......... B60Q 1/04; B60Q 1/0035; B60Q 1/24; F21S 41/67; F21S 41/14; B64C 13/18; B64C 39/02; G02B 26/101
USPC ......................................................... 362/516
See application file for complete search history.

(56) References Cited

U.S. PATENT DOCUMENTS

| | | | | |
|---|---|---|---|---|
| 4,115,841 A | * | 9/1978 | Alexander | ............. B64D 47/02 362/44 |
| 6,350,041 B1 | * | 2/2002 | Tarsa | .................... F21V 7/0091 257/E33.072 |

(Continued)

FOREIGN PATENT DOCUMENTS

JP 2015-201296 A 11/2015

*Primary Examiner* — Bryon T Gyllstrom
(74) *Attorney, Agent, or Firm* — Abelman, Frayne & Schwab

(57) ABSTRACT

Disclosed is a vehicle lighting system including: an unmanned flying object configured to fly around a vehicle; a light source device provided in the vehicle, and a reflecting member provided in the unmanned flying object and configured to reflect light from the light source device and project the light around the vehicle.

11 Claims, 3 Drawing Sheets

(51) Int. Cl.
*F21S 41/365* (2018.01)
*F21W 103/60* (2018.01)

(56) References Cited

U.S. PATENT DOCUMENTS

| | | | |
|---|---|---|---|
| 7,111,943 B2* | 9/2006 | Agostinelli | G03B 21/56 353/79 |
| 9,630,713 B1* | 4/2017 | Von Novak, III | B64C 25/52 |
| 2004/0233664 A1* | 11/2004 | Beeson | G02B 19/0019 362/231 |
| 2006/0060761 A1* | 3/2006 | Williams | G01S 17/895 250/221 |
| 2012/0044710 A1* | 2/2012 | Jones | B64C 39/024 362/470 |
| 2014/0022051 A1* | 1/2014 | Levien | G05D 1/0011 340/5.2 |

* cited by examiner

VEHICLE LIGHTING SYSTEM

CROSS-REFERENCE TO RELATED APPLICATIONS

This application is based on and claims priority from Japanese Patent Application No. 2017-133055, filed on Jul. 6, 2017 with the Japan Patent Office, the disclosure of which is incorporated herein in its entirety by reference.

TECHNICAL FIELD

The present disclosure relates to a vehicle lighting system.

BACKGROUND

In the related art, in order to call attention to a driver, a pedestrian, or the like, technology for projecting information such as, for example, letters or figures around a vehicle using a vehicle lamp has been proposed (see, e.g., Japanese Laid-open Patent Publication No. 2015-201296).

SUMMARY

When using a vehicle lamp, there is a limit in an area where vehicle information is able to be projected. For example, it may be impossible to project the vehicle information to an area that is a blind spot from the vehicle.

The present disclosure has been made in consideration of the circumferences, and provides a vehicle lighting system capable of projecting light to a wider area.

In order to solve the above problem, a vehicle lighting system according to an aspect of the present exemplary embodiment includes an unmanned flying object configured to fly in the vicinity of a vehicle, a light source device provided in the vehicle, and a reflecting member provided in the unmanned flying object and configured to reflect light from the light source device and project the light around the vehicle.

The vehicle may include a control device configured to control a flight state of the unmanned flying object.

The light source device may be configured to project a laser beam.

The light source device may be configured to project blue light or violet light, and the reflecting member may include a wavelength conversion layer configured to convert the blue light or the violet light from the light source device into white light.

The reflecting member may be configured to be able to reflect the light from the light source device and to draw figures and/or letters around the vehicle.

According to the present exemplary embodiment, it is possible to provide a vehicle lighting system capable of projecting light in a wider area.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
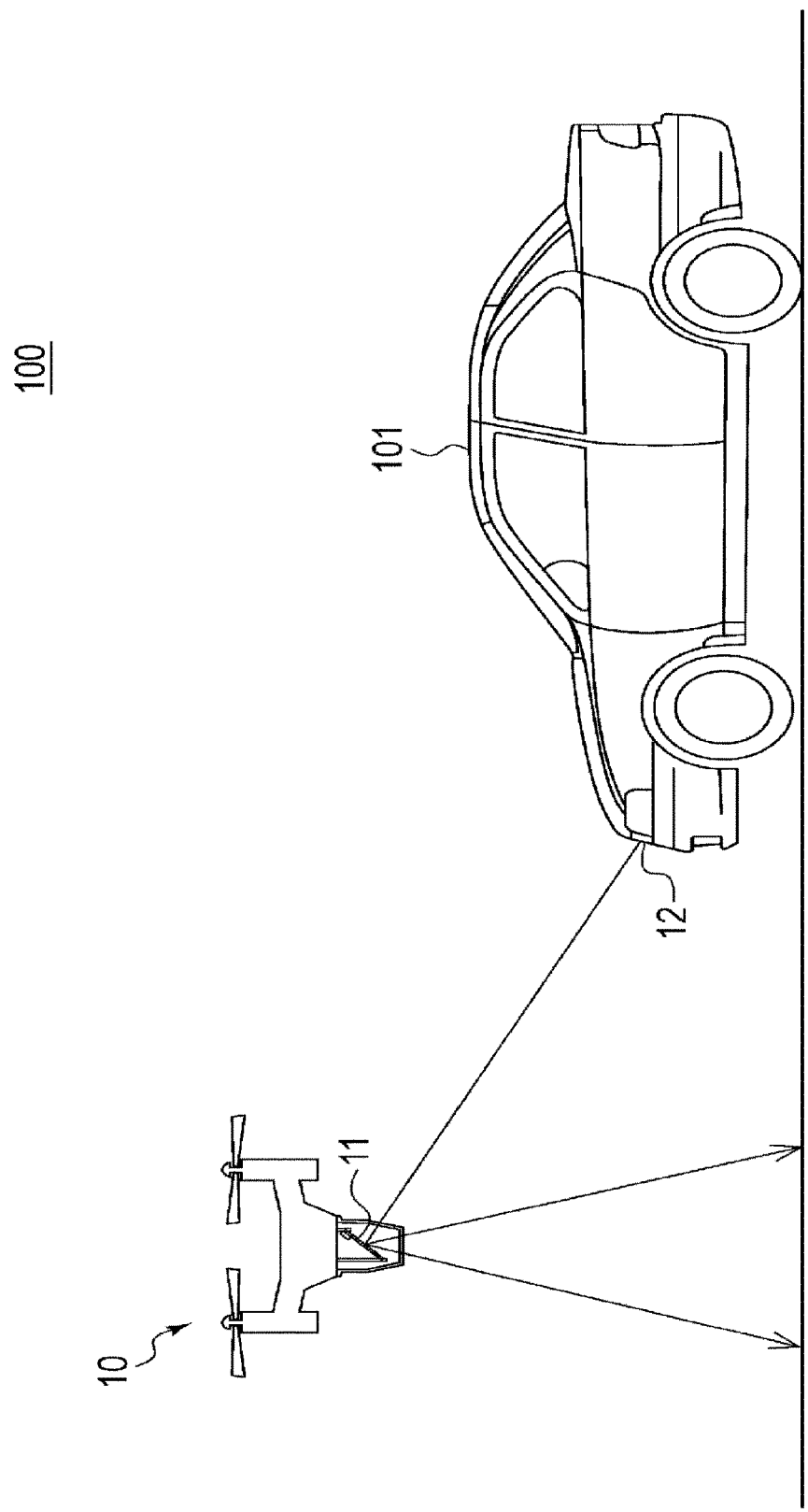
FIG. 1 is a view for explaining a vehicle lighting system according to an exemplary embodiment.

In the following detailed description, reference is made to the accompanying drawing, which form a part hereof. The illustrative embodiments described in the detailed description, drawing, and claims are not meant to be limiting. Other exemplary embodiments may be utilized, and other changes may be made, without departing from the spirit or scope of the subject matter presented here.

Hereinafter, a vehicle lighting system according to an exemplary embodiment of the present disclosure will be described in detail with reference to the drawings. Since each of the drawings is provided to explain a positional relationship of each member, the drawings do not represent an actual dimensional relationship of each member. Further, in the description of each exemplary embodiment, the same or corresponding elements are denoted by the same reference numerals and redundant explanation will be properly omitted.

FIG. 1 is a view for explaining a vehicle lighting system 100 according to an exemplary embodiment. As illustrating in FIG. 1, the vehicle lighting system 100 includes an unmanned flying object 10 configured to fly in the vicinity of a vehicle 101 and a light source device 12 provided in the vehicle 101. The unmanned flying object 10 includes a reflecting member 11 configured to reflect light from the light source device 12 of the vehicle 101 and to project the light around the vehicle 101.

According to the vehicle lighting system 100, it is possible to draw figures and/or letters around the vehicle so as to call attention to a driver, a pedestrian, or the like. Since the projection is performed by the unmanned flying object 10 configured to fly in the vicinity of the vehicle 101, it is able to project a letter or a figure even to an area to which light is difficult to be projected light by a vehicle lamp body mounted in the vehicle 101. For example, at an intersection, by projecting letters such as "STOP" or an arrow configured to indicate that a vehicle is approaching, to an area that is a blind spot from a vehicle, it is possible to call attention to other drivers or pedestrians.

Figure 2:
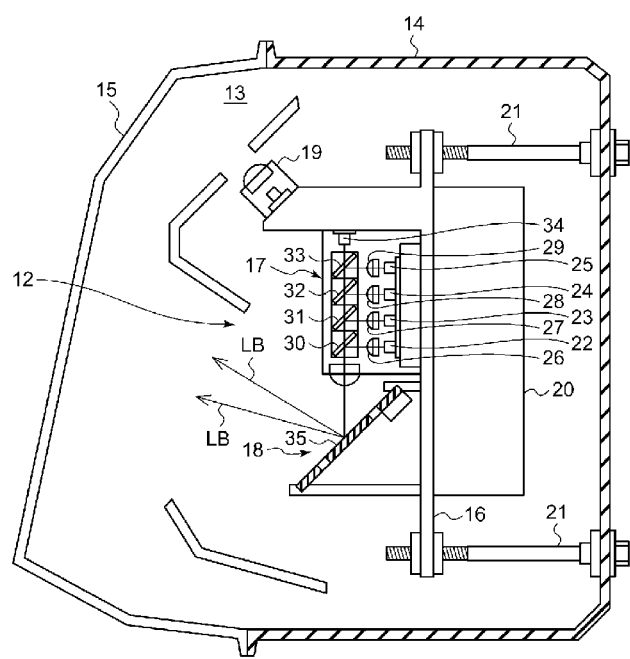
FIG. 2 is a view for explaining a light source device mounted in a vehicle.

FIG. 2 is a view for explaining a light source device 12 mounted in the vehicle 101. In the present exemplary embodiment, the light source device 12 is disposed in a lamp chamber 13 of a head lamp disposed in the front portion of the vehicle 101. The lamp chamber 13 is formed inside a lamp body 14 and a transparent cover 15 configured to cover a front opening of the lamp body 14. However, the position of the light source device 12 is not limited to the inside of the lamp chamber 13 of the head lamp. For example, the light source device 12 may be disposed on the upper portion of the windshield of the vehicle 101.

The light source device 12 includes a support member 16 configured to support each component of the light source device 12, a laser beam source unit 17 configured to emit a plurality of laser beams so as to make the color of projected light changeable, a light source side light scanning device 18 including, for example, a MEMS mirror and configured to draw a figure such as, for example, a line or a diagram on a region to which light is projected by scanning the laser beam from the laser beam source unit 17, and a control unit 20 configured to control, for example, the laser beam source unit 17 or the light source side light scanning device 18.

The laser beam source unit 17, the light source side light scanning device 18, and the control unit 20 are attached to the support member 16. The support member 16 is attached to the lamp body 14 via aiming screws 21.

The laser beam source unit 17 includes a red laser 22, a green laser 23 and a blue laser 24, a lens 26 for a red color, a lens 27 for a green color, and a lens 28 for a blue color, and a dichroic mirror 30 for a red color, a dichroic mirror 31 for a green color, and a dichroic mirror 32 for a blue color.

A red laser beam emitted from the red laser 22 is converted into parallel light by passing through the lens 26 for the red color, and then reflected toward the light source side light scanning device 18 by the dichroic mirror 30 for the red color. A green laser beam emitted from the green laser 23 is converted into parallel light by passing through the lens 27 for the green color, and then reflected toward the light source side light scanning device 18 by the dichroic mirror 31 for the green color. A blue laser beam emitted from the blue laser 24 is converted into parallel light by passing through the lens 28 for the blue color, and then reflected toward the light source side light scanning device 18 by the dichroic mirror 32 for the blue color. Three colors of red light R, green light G, and blue light B are mixed through the dichroic mirrors so that a white laser beam LB is generated.

The light source side light scanning device 18 is a MEMS mirror, and includes a reflecting member 35 configured to reflect the laser beam LB from the laser beam source unit 17 toward the reflecting member 11 in the unmanned flying object 10. The light source side light scanning device 18 scans the laser beam LB so as to draw a required letter or a figure on a road surface or a wall surface with cooperation with the light source side light scanning device in the unmanned flying object, by reciprocally rotating the reflecting member 35 vertically and horizontally. Further, the light source side light scanning device 18 may adopt various light scanning devices such as, for example, a galvanometer mirror, in addition to the MEMS mirror.

The light source device 12 includes a camera 19 configured to image the unmanned flying object 10, an infrared laser 25, a lens 29 for an infrared ray, a dichroic mirror 33 for an infrared ray, and an infrared ray receiving unit 34, which constitute a light detection and ranging (LIDAR) system configured to confirm the position of the unmanned flying object 10.

An infrared laser beam emitted from the infrared laser 25 is converted into parallel light by passing through the lens 29 for the infrared ray, and then reflected toward the light source side light scanning device 18 by the dichroic mirror 33 for the infrared ray. The infrared laser beam is reflected toward the unmanned flying object 10 by the reflecting member 35 in the light source side light scanning device 18. The infrared laser beam reflected from the unmanned flying object 10 is detected at the infrared ray receiving unit 34 via the reflecting member 35, the dichroic mirror, or the like. The control unit 20 confirms the position of the unmanned flying object 10 by analyzing the reflected infrared laser beam detected at the infrared ray receiving unit 34. The position of the unmanned flying object 10 is able to be confirmed more accurately by using an image of the unmanned flying object 10 imaged by the camera 19. The control unit 20 controls a flight state of the unmanned flying object 10 on the basis of position information of the unmanned flying object 10.

Figure 3:
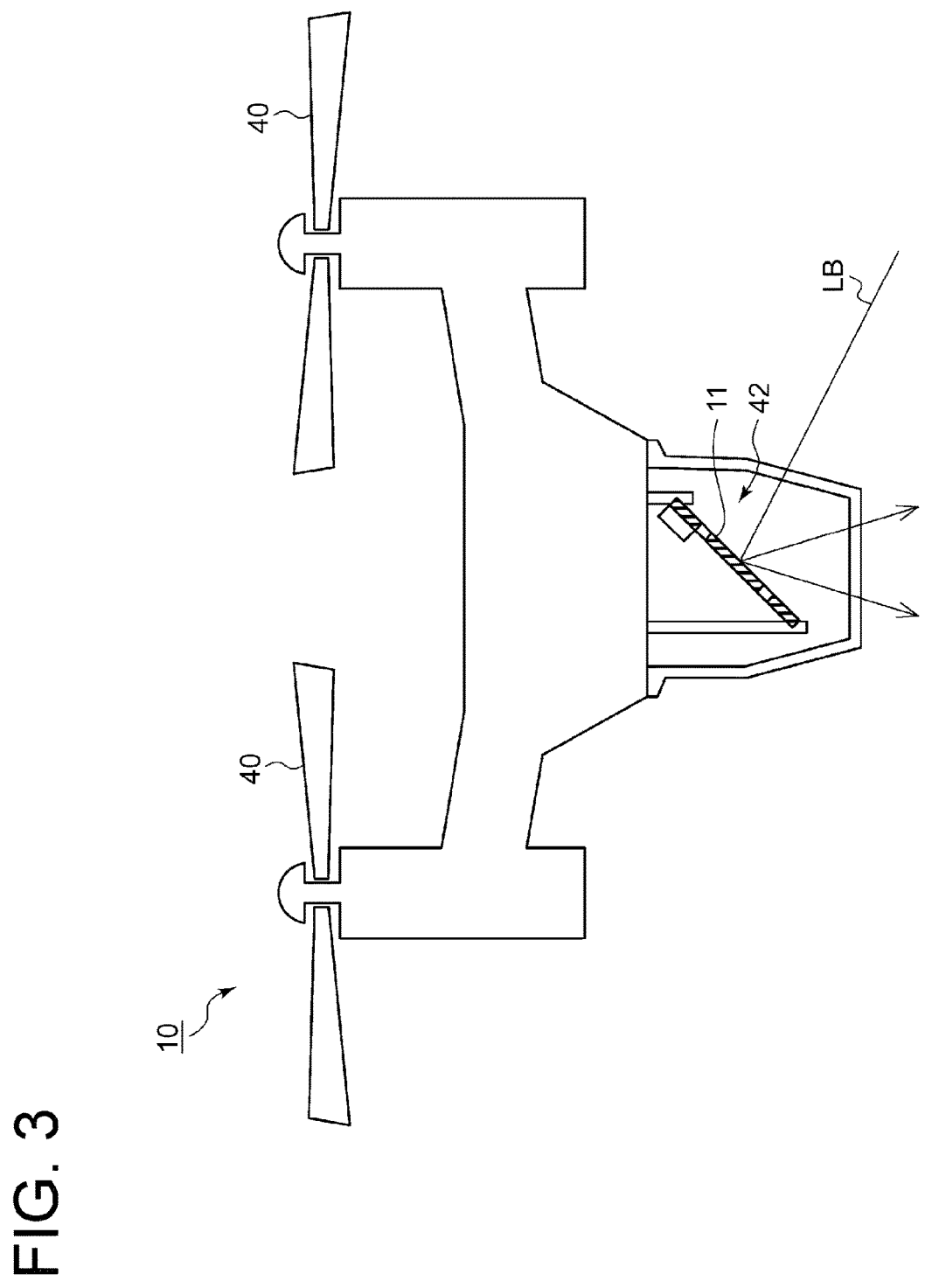
FIG. 3 is a view for explaining an unmanned flying object.

FIG. 3 is a view for explaining the unmanned flying object 10. The unmanned flying object 10 may be a drone, and flies around the vehicle 101 on the basis of a control signal from the control unit 20 of the light source device 12 mounted in the vehicle 101.

The unmanned flying object 10 includes a flying object side light scanning device 42. The flying object side light scanning device 42 includes the reflecting member 11 configured to reflect the laser beam LB from the light source device 12 of the vehicle 101. The flying object side light scanning device 42 scans the laser beam LB so as to draw a required letter or figure on a road surface or a wall surface with cooperation with the light source side light scanning device 18 of the light source device 12, by reciprocally rotating the reflecting member 11 vertically and horizontally. Further, the flying object side light scanning device 42 may adopt various light scanning devices such as, for example, a galvanometer mirror, in addition to the MEMS mirror.

In the vehicle lighting system 100 according to the present exemplary embodiment, the unmanned flying object 10 may be resident, for example, at an intersection, and when the vehicle 101 approaches the intersection, the flight state of the unmanned flying object 10 may be controlled by the control unit 20 of the light source device 12. Alternatively, the unmanned flying object 10 may always fly around the vehicle 101. Alternatively, the unmanned flying object may be normally stored in the vehicle 101, and may take off from the vehicle 101 only when necessary. The unmanned flying object 10 flies to a predetermined position under the control of the control unit 20, reflects the laser beam LB from the light source device 12 of the vehicle 101, and draws a figure and/or a letter on a road surface or a wall surface so as to call attention to a driver, pedestrian, or the like. According to the vehicle lighting system 100 according to the present exemplary embodiment, since projection is performed via the unmanned flying object 10 configured to fly around the vehicle 101, it is possible to project information such as a letter or a figure to a wider area compared to the case where light is projected directly from a lamp provided in the vehicle 101 to a road surface or the like.

Since the vehicle lighting system 100 according to the present exemplary embodiment is configured to reflect the light from the light source device 12 of the vehicle 101, it is not necessary to provide the unmanned flying object 10 with a light source. Therefore, it is possible to reduce weight and power consumption of the unmanned flying object 10.

The vehicle lighting system 100 according to the present exemplary embodiment is configured to project light from the sky, which is advantageous in that it is difficult to dazzle a pedestrian.

In the foregoing description, exemplary embodiments configured to project a letter or a figure so as to call attention has been described, an exemplary embodiment may be configured to simply project light such as spot light. In this case as well, since it is possible to project light to an area to which light is difficult to be directly projected from a vehicle lamp mounted in the vehicle 101, it is possible to enhance the visibility of a pedestrian or an obstacle.

The present disclosure has been described above based on exemplary embodiments. The exemplary embodiments are merely examples, and a person ordinarily skilled in the related art may understand that various modifications may be made to a combination of respective components or respective processes and such modifications are also within the scope of the present disclosure.

For example, in the exemplary embodiments described above, the light source device 12 mounted in the vehicle 101 is configured project a white laser beam by mixing three colors of RGB. However, the configuration of the light source device 12 is not limited thereto, and the light source device may be configured to project a laser beam of blue light or violet light, for example. In this case, it is possible to project a white laser beam by providing a wavelength conversion layer, configured to convert blue light or violet light into white light, on the reflecting member 11 mounted in the unmanned flying object 10.

Further, in the exemplary embodiments described above, although the light source device 12 is configured to project a laser beam, light projected from the light source device 12 is not limited to a laser beam. For example, the light projected by the light source device 12 may be light projected from a LED.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lighting system comprising:
   an unmanned flying object configured to fly around a vehicle running on a ground;
   a light source provided in the vehicle running on the ground;
   a first reflector provided in the vehicle running on the ground and configured to reflect light from the light source to the unmanned flying object; and
   a second reflector provided in the unmanned flying object and configured to reflect light from the first reflector such that the light from the light source of the vehicle is projected into an area around the vehicle running on the ground,
   wherein the area includes a blind spot from the vehicle.

2. The vehicle lighting system of claim 1, wherein the vehicle includes a controller configured to control a flight state of the unmanned flying object.

3. The vehicle lighting system of claim 2, wherein the light source is configured to project a laser beam.

4. The vehicle lighting system of claim 3, wherein the light source is configured to project blue light or violet light, and the second reflector includes a wavelength conversion layer configured to convert the blue light or the violet light from the light source into white light.

5. The vehicle lighting system of claim 2, wherein the light source is configured to project blue light or violet light, and the second reflector includes a wavelength conversion layer configured to convert the blue light or the violet light from the light source into white light.

6. The vehicle lighting system of claim 1, wherein the light source is configured to project a laser beam.

7. The vehicle lighting system of claim 6, wherein the light source is configured to project blue light or violet light, and the second reflector includes a wavelength conversion layer configured to convert the blue light or the violet light from the light source into white light.

8. The vehicle lighting system of claim 1, wherein the light source is configured to project blue light or violet light, and the second reflector includes a wavelength conversion layer configured to convert the blue light or the violet light from the light source into white light.

9. The vehicle lighting system of claim 1, wherein the second reflector is configured to reflect the light from the light source so as to draw a figure and/or a letter around the vehicle.

10. The vehicle lighting system of claim 1, wherein the light source of the vehicle includes a camera configured to capture an image of the unmanned flying object, and
    a position of the unmanned flying object is detected by the camera.

11. The vehicle lighting system of claim 1, wherein the vehicle includes an infrared ray receiver configured to detect light reflected from the second reflector provided in the unmanned flying object.

* * * * *